J. B. POLO.
ALARM FOR PNEUMATIC TIRES.
APPLICATION FILED JAN. 4, 1913.
1,091,016.
Patented Mar. 24, 1914.
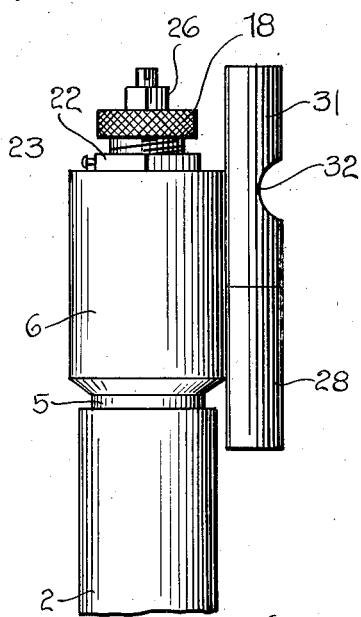
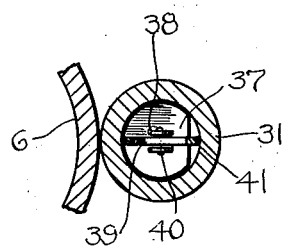
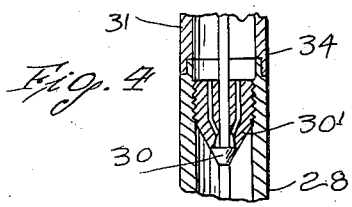
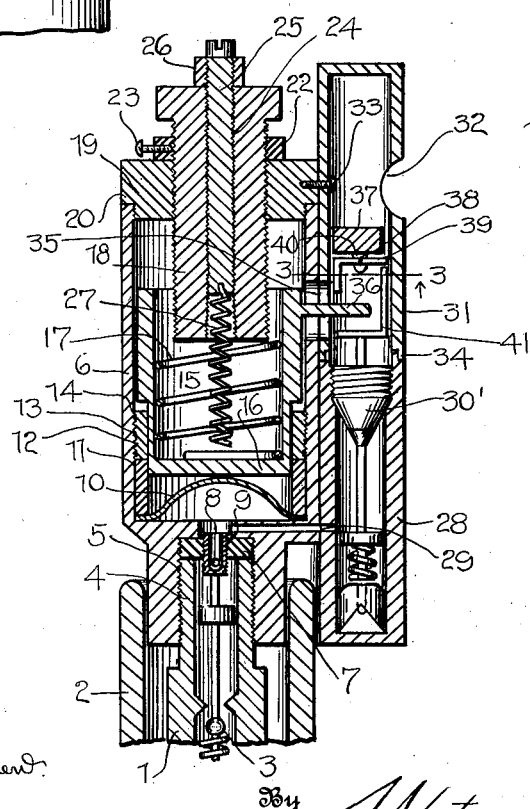
Witnesses
Robert M. Sutphen
A. D. Hind
Inventor
J. B. Polo.
By Watson E. Coleman
Attorney

UNITED STATES PATENT OFFICE.

JOSEPH B. POLO, OF CLEAR LAKE, SOUTH DAKOTA.

ALARM FOR PNEUMATIC TIRES.

1,091,016. Specification of Letters Patent. Patented Mar. 24, 1914.

Application filed January 4, 1913. Serial No. 740,249.

*To all whom it may concern:*

Be it known that I, JOSEPH B. POLO, a citizen of the United States, residing at Clear Lake, in the county of Deuel and State of South Dakota, have invented certain new and useful Improvements in Alarms for Pneumatic Tires, of which the following is a specification, reference being had to the accompanying drawings.

This invention comprehends certain new and useful improvements in alarms for pneumatic tires, and has for its primary object to provide an alarm which will give an audible signal when the pressure within the tire increases or decreases below predetermined points.

Another object is to provide a device of this character which will be automatic in operation and which will be of comparatively simple construction.

Another object is to provide a device of this character which may be regulated to vary the operation of the parts thereof and thereby set the device to give the signal upon the decrease or increase of the air pressure within the tire above or below any point desired.

A further object is to construct a device of this character which may be regulated to give the signal, upon either an increase or decrease of pressure in the tire, or simply upon the decrease of pressure, as desired.

A further object is to provide a device of this type which will be of improved and simplified construction and highly efficient and effective in the performance of its duties.

With the above and other objects in view, this invention consists in certain novel details of construction, combination and arrangement of parts to be hereinafter more fully described, claimed, and particularly pointed out in the accompanying drawings, in which—

Figure 1 is a longitudinal section through my complete device applied to an ordinary valve stem. Fig. 2 is an elevational view of the same. Fig. 3 is a detail cross sectional view on the line 3—3 of Fig. 1. Fig. 4 is a fragmentary longitudinal section through the first and second cylinders and through the check valve 30 and valve seat 30'.

Referring more particularly to the drawings, in which similar reference characters designate corresponding parts throughout, the numeral 1 designates the valve stem of the ordinary form employed in connection with pneumatic tires and surrounded by a protecting sleeve 2, which may be secured to the wheel felly in any suitable manner.

The ordinary check valve 3 is positioned in the end of the valve stem, and the extremity of the valve stem is reduced and threaded, as shown at 4, for engagement in the lower threaded end 5 of the chamber 6, the protecting sleeve 2 surrounding and protecting the connected ends of the valve stem and chamber.

Within the lower end of the chamber 6 is positioned the washer 7, preferably formed of lead, but which may be constructed of any pliable metal or alloy, or other suitable material. The end of the valve stem 1 is engaged against the washer 7 and the stop member 8, having its upper end open, is threaded in the washer 7 and has its closed upper end engaged against the end of the stem of the check valve 3, to retain said valve in open position. The stop member 8 is of such size that the wall thereof is spaced from the interior of the valve stem 1 and the stop member 8 is provided in one wall thereof with the opening 9 to allow the air from the stem 1 to enter the chamber 6. Within the lower end of the chamber 6 is positioned the diaphragm 10, which is held in position by the ring 11, which engages the edge of the diaphragm and retains the same against the end of the main portion of the cylinder, it being understood that the lower end of the chamber is reduced in diameter, as clearly shown on the drawings. The ring 11 is held in proper position by means of a second ring 12, which is provided with the exterior threads 13 engaged with the threaded interior 14 of the main portion of the chamber 6.

The thimble 15 is slidably positioned in the chamber 6, and has its closed end 16 adapted for engagement with the upper face of the diaphragm 10, it being understood that the lower end of the thimble is reduced in diameter for sliding engagement within the rings 11 and 12. The coil spring 17 is positioned within the thimble 15 and has one end engaged against the closed end of said thimble, while the opposite end of the spring is engaged against the lower end of the screw 18, which is threaded through the plug 19, threaded in the upper open end of the chamber 6 and provided with the flange 20 to limit the inward movement of said plug. The screw 18 has the roughened head by means of which the screw may be readily rotated in either direction to regulate the tension of the spring 17, as will be later clearly apparent. The screw 18 is also provided with the stop collar 22 and set screw 23, by means of which the stop collar 22 may be secured at any point along the screw 17 to limit inward movement of said screw.

The threaded bore 24 extends longitudinally through the screw 18, and within this threaded bore is engaged the small screw 25, which has the stop nut 26 upon its upper end while the coil spring 27 is secured by one end to the lower end of the screw 25, the lower end of the coil spring 27 being adapted to be compressed at times by engagement therewith of the closed end 16 of the thimble 15. Secured to the outer face of the chamber 6 and extending longitudinally thereof, is a cylinder 28, the upper end of which terminates about mid-way of the length of the main portion of the chamber 6, while the lower end of the cylinder 28 is about on a line with the lower extremity of the reduced end of said chamber. The air passage 29 through the adjacent walls of the main portion of the chamber 6 and the cylinder 28, allows the compressed air to travel from the chamber 6 to the cylinder 28, it being understood that this passage is below the diaphragm 10. Within the cylinder 28 is a check valve 30, similar to the check valve 3 in the valve stem 1, said check valve 30 being normally seated upon the valve seat 30' in the upper end of the cylinder 28. It will also be understood that the lower end of the cylinder 28 is closed, while the upper end thereof is open, and the stem of the check valve 30 extends slightly above the open upper end of the cylinder 28 and into the lower open end of the second cylinder 31, the upper end of the second cylinder being closed and the wall of said second cylinder being provided with the air escape opening 32.

The second cylinder 31 is secured to the plug 19 by means of the screw 33, the head of which is opposite the air escape opening 32, thus making it possible to readily position or remove the second cylinder. It will be understood that the lower end of the second cylinder and the upper end of the first cylinder are suitably connected to form an air-tight joint, as shown at 34.

The chamber 6 and second cylinder 31 are provided with communicating openings in their adjacent sides, as shown at 35, and the stud 36 secured to the thimble 15 adjacent the upper edge thereof projects through the openings 35. The purpose of the stud will be later understood. Within the lower end of the second cylinder 31, but above the opening 35 therein, is secured the lip 37, which has the parallel depending lugs 38 between which is pivoted the rock arm 39 by means of the pivot pin 40. The rock arm 39 has one end directed downwardly below the openings 35 and adapted for engagement by the stud 36 when the thimble 15 is in its uppermost position. When the thimble 15 is in its lowermost position however, the stud 36 is engaged against the horizontal arm of the L-shaped slide member 41, which arm is in turn engaged against the end of the stem of the check valve 30. The vertical arm of the L-shaped slide member 41 is normally engaged against the straight end of the rock arm 39.

From the above description, taken in connection with the accompanying drawings, it will be evident that the compressed air from within the tire will press against the under face of the diaphragm 10, forcing the thimble 15 upwardly, and when the parts are properly adjusted and the proper pressure is present within the tire, the thimble will be held in a normal or neutral position with the stud 36 between the end of the rock arm 39 and the horizontal portion of the L-shaped slide member 41, thus permitting the check valve 30 to remain in closed position. Should the pressure within the tire decrease, owing to a puncture or any other cause, the coil spring 17 will overcome the pressure against the under face of the diaphragm 10 and force the thimble 15 downwardly against said diaphragm, thus causing the stud 36 to press downwardly upon the horizontal portion of the L-shaped slide member 41, and thereby open the check valve 30 and permit the air to travel through the cylinder 28 to the second cylinder 31, pass the lip 37 and out to the atmosphere by means of the escape opening 32, thereby giving an audible signal. Should there be an excessive amount of pressure in the tire and against the under face of the diaphragm 10, the thimble 15 will be forced upwardly to its uppermost position against the tension of the spring 17, and also the spring 27. When the thimble assumes this position, the stud 36 engages the depending end of the rock arm 39 and causes the same to rock upon the pivot pin 40 and force the slide member 41 downwardly, the horizontal portion of said slide member 41 opening the check valve 30, thus permitting the air to pass said check valve, enter the second cylinder 31 and travel past the lip 37 to the atmosphere by means of the opening 32 to give the signal and allow the escape of the proper amount of air. It will be understood that as soon as a sufficient amount of air has escaped by this latter operation of the device, the springs 27 and 17 will overcome the pressure against the under face of the diaphragm 10 and return the thimble 15 to its normal or neutral position. It will be clearly apparent that the device may be regulated to any desired pressure by adjusting the screws 18 and 25. For instance, a pneumatic tire which is built for use with an air pressure of sixty pounds, should not be run with a pressure lower than thirty-five pounds or higher than sixty-five pounds, therefore, when my device is employed in connection with a tire of this character, the screws 18 and 25 are adjusted so that when the pressure in the tire decreases below thirty-five pounds, the spring 17 will force the thimble downwardly until the stud 36 presses downwardly upon the horizontal portion of the slide member 41 to open the check valve 30, as previously described. Likewise, when the pressure within the tire increases above sixty-five pounds, the thimble 15 will be forced upwardly against the tension of the spring 17 and the spring 27 until the stud 36 engages the depending end of the rock arm 39, thus forcing the arm to swing upon its pivot and move the slide member 41 downwardly to open the check valve 30, as also previously described. It will be evident, however, that a slight rotation of the screws 18 and 25 will adjust the device to give its signal or allow the escape of the excessive amount of air when the pressure is too high, as desired. It will further be evident that by rotating the screw 25 a sufficient distance to properly compress the spring 27, operation of the device upon the increase of pressure may be avoided should occasion require.

While I have described my device as employed upon a pneumatic tire, it will be evident that the same may be used in connection with compressed air storage tanks for compressed air engines and in fact may be employed in connection with various devices where it is required to retain compressed air and prevent the pressure of the air from increasing or decreasing beyond predetermined points.

It will further be evident that while I have shown the preferred form of the device, I do not wish to be limited to this specific construction, as minor changes may be made in various parts of the device within the scope of the appended claims without departing from the spirit of my invention.

The diaphragm 10 may be formed of any suitable material, but is preferably constructed of rubber, or other soft, pliable, flexible material which will offer very little resistance and which is non-porous and air-tight.

It will be understood that when the pressure increases above a predetermined point, the apparatus will operate to exhaust the excessive pressure within the tire, caused by carelessness in inflating the tire or by the natural increase of pressure from friction or heat. In the former case, as soon as the device is secured upon the valve stem, it will operate to exhaust the excessive pressure and if the pressure within the tire is sufficient, the audible signal will be given. In this second case, however, when the pressure is increased by the expansion of air caused by heat and friction, the increase will be gradual and insufficient to cause the audible signal to be given.

What is claimed is:—

1. A pneumatic signal removably engaged with the end of a valve tube and comprising a chamber, a sliding thimble within the chamber, a cylinder carried by the chamber and having communication therewith, a second cylinder carried by the chamber and in alinement with the first cylinder, the adjacent walls of the chamber and the second cylinder being provided with registering openings, a stud carried by the thimble and projecting through the registering openings and into the second chamber, a check valve carried by the first cylinder, the second cylinder having an air escape opening and a plate therein and located adjacent said opening, means for sliding the thimble in one direction upon increase of the pressure within the valve stem, means for limiting movement of the thimble in this direction, means for sliding the thimble in an opposite direction upon a decrease of the pressure in the valve stem, means for limiting movement of the thimble in this direction, and means carried by the second cylinder for operating the check valve in the first cylinder to permit air to travel from the first cylinder to the second cylinder and pass the plate to the atmosphere by means of the air escape opening to give a signal upon movement of the sliding thimble.

2. A pneumatic signal comprising the combination with a valve controlled tube, of a chamber positioned on the end of the tube and communicating therewith, a cylinder carried by the chamber and communicating with one end thereof, a check valve in the cylinder, a second cylinder carried by the chamber and in alinement with the first cylinder, said cylinders being connected at their open ends, the second cylinder having an air escape opening, a plate positioned in the second cylinder below the air escape opening, a rock arm pivoted to the plate and having a depending end, a right angled slide member having one arm engaged against the straight end of the rock arm, the other arm of the slide member being engaged against the check valve in the first cylinder, a thimble within the chamber, a stud carried by the thimble and projecting into the second cylinder, said stud being normally spaced between the rock arm and the slide member, means carried by the chamber for forcing the thimble downwardly upon decrease of the pressure within the tube, the stud being adapted to engage the slide member to force the same downwardly and open the check valve to give the signal upon downward movement of the thimble, means for forcing the thimble upwardly and causing the stud to engage the depending end of the rock arm to operate the slide member and give the signal upon an increase of the pressure above a predetermined point, and means for controlling movement of the thimble.

3. A pneumatic signal removably engaged with the end of a valve tube and comprising a chamber, a sliding thimble within the chamber, a cylinder carried by the chamber and having communication therewith, a second cylinder in alinement with the first cylinder and communicating with the same, the chamber and second cylinder having registering openings forming communication between said chamber and second cylinder, a check valve carried by the first cylinder, the second cylinder having an air escape opening and a plate adjacent said opening and within the cylinder, a pivoted member carried by the plate, a slidable member between the pivoted member and the check valve in the first cylinder, and means carried by the sliding thimble and projecting into the second cylinder for engagement with the slidable member when the thimble is moved in one direction upon decrease of pressure within the valve stem, said thimble being adapted to be moved in an opposite direction upon increase of the pressure, the means carried by the thimble being adapted to engage the pivoted member when the thimble is moved in the last mentioned direction, the signal being given by the slidable member opening the check valve in the first cylinder to permit air to travel from said first cylinder to the second cylinder and pass the plate to the atmosphere by means of the air escape opening, and means for resiliently retaining the thimble in normal position.

4. A pneumatic signal comprising the combination with a valve controlled tube, of a chamber positioned on the end of the tube and communicating therewith, a cylinder carried by the chamber and communicating with one end thereof, a check valve in the cylinder, a second cylinder carried by the chamber and removably engaged with one end of the first cylinder, said cylinders having their connected ends open to form communication between said cylinders, the second cylinder having an air escape opening, a plate carried by the second cylinder below the air escape opening, a right angled rock member pivoted by one of its arms to the plate while its other arm depends from the first arm adjacent the chamber, the chamber and second cylinder having registering openings forming communication between said chamber and cylinder, the free end of the depending arm of the right angled rock member extending below said registering openings, a right angled slide member having its long arm engaged against the first mentioned arm of the rock member, the other arm of the slide member being engaged against the check valve in the first cylinder, a thimble within the chamber, a stud carried by the thimble and projecting into the second cylinder, said stud being normally spaced between the depending arm of the rock member and one arm of the slide member, means carried by the chamber for forcing the thimble downwardly upon decrease of the pressure within the tube, the stud being adapted to engage the slide member to force the same downwardly and open the check valve to give the signal upon downward movement of the thimble, means for forcing the thimble upwardly and causing the stud to engage the depending arm of the rock member to operate the slide member and give the signal upon an increase of the pressure above a predetermined point, and means for controlling movement of the thimble.

In testimony whereof I hereunto affix my signature in the presence of two witnesses.

JOSEPH B. POLO.

Witnesses:
E. E. WALSETH,
J. A. THRONSON.